United States Patent [19]

Pedersen

[11] 4,241,876
[45] Dec. 30, 1980

[54] VARIABLE AREA EXHAUST NOZZLE

[75] Inventor: George H. Pedersen, Indianapolis, Ind.

[73] Assignee: General Motors Corporation, Detroit, Mich.

[21] Appl. No.: 22,706

[22] Filed: Mar. 22, 1979

[51] Int. Cl.² .............................................. B64C 15/06
[52] U.S. Cl. ................................ 239/265.27; 60/229; 60/230; 244/12.5
[58] Field of Search ...................... 244/12.5, 23 D, 52; 60/229, 230, 271; 239/265.19, 265.27, 265.31, 265.25

[56] References Cited

U.S. PATENT DOCUMENTS 3,774,868 11/1973 Goetz .......................... 239/265.19 X Primary Examiner—Andres Kashnikow
Attorney, Agent, or Firm—J. C. Evans

[57] ABSTRACT

A two dimensional vectoring nozzle assembly has an expandable plug therein including a first pair of panels and a second pair of downstream panels extending between spaced, parallel side walls and wherein a pivoted connection between the first pair of inlet panels and the second pair of downstream panels is located at the nozzle throat and is associated with a mechanism to cause the pivoted connection therebetween to move substantially in a vertical plane at the throat of the nozzle between open and closed positions therein and wherein an exhaust port in the nozzle is selectively opened by a movable door operated between open and closed positions by the mechanism and operative when the expandable nozzle is in its closed position to open the door to concurrently restrict flow through the throat region of the nozzle while opening the exhaust port whereby exhaust flow through the nozzle is directed by the blocking action of the expandable plug from a point upstream thereof through the exhaust opening in the nozzle thereby to produce a thrust vector on the nozzle assembly arranged generally perpendicularly to the flow of gas through the exhaust nozzle during restricted gas flow through the outlet thereof.

3 Claims, 5 Drawing Figures

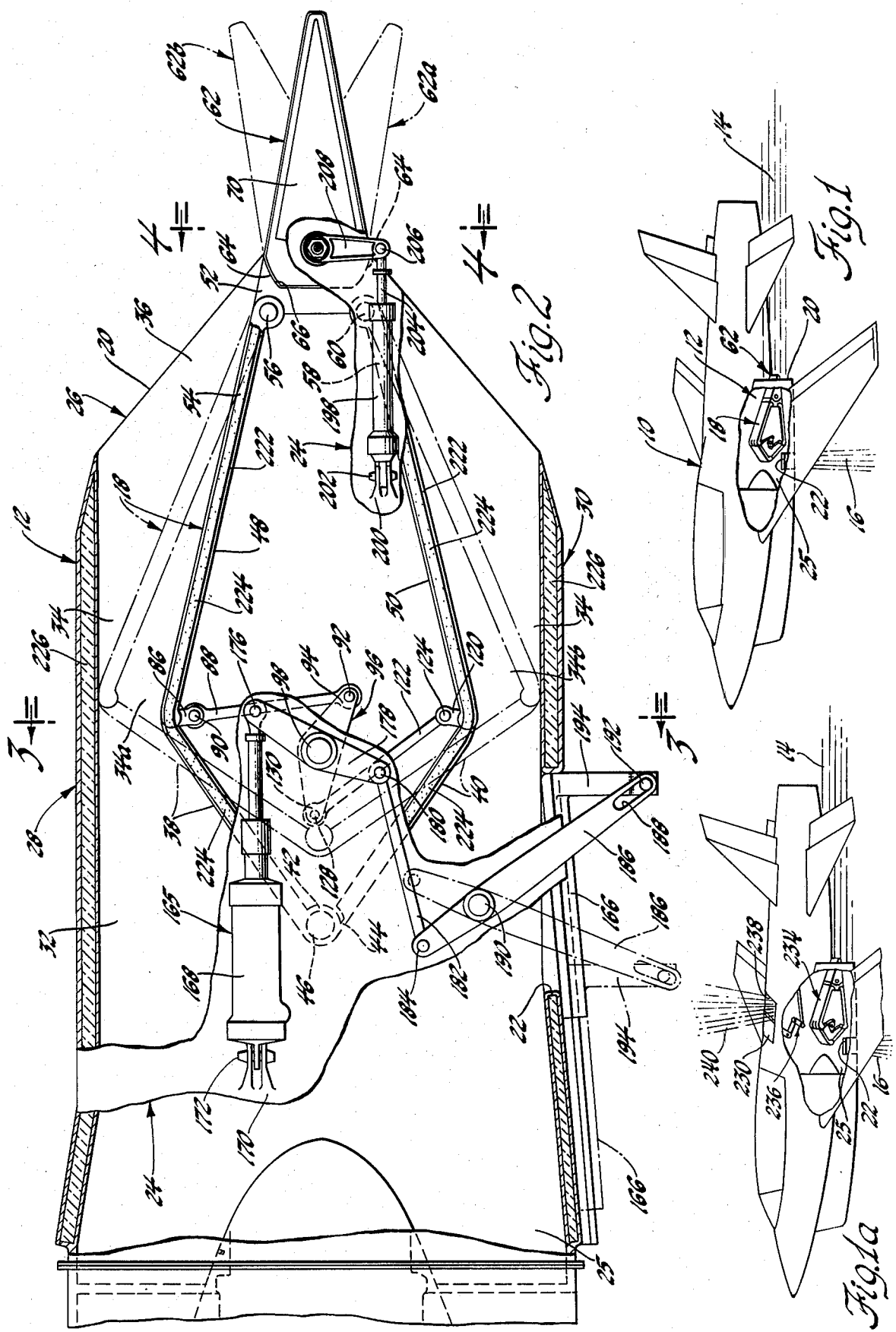

VARIABLE AREA EXHAUST NOZZLE

The invention herein described was made in the course of work under a contract or subcontract thereunder with the Department of Defense.

This invention relates to exhaust systems for gas turbine engine powered aircraft and more particularly to two dimensional type nozzles having an expandable plug therein.

In aircraft propulsion systems it is recognized that two dimensional type nozzles are readily adaptable with respect to wing and fuselage installations. In prior art arrangements such two dimensional nozzles have included thrust reversal mechanisms which function in conjunction with the thrust control action of an internal plug assembly which is expandable with respect to flat parallel side wall portions of the nozzle to vary the flow area therethrough.

An object of the present invention is to improve two dimensional nozzles by including integrated vertical thrust vectoring components in association therewith and means to vary the flow area through the throat region of the nozzle wherein the exhaust nozzle is suitable for use with vertical take off and landing aircraft so that take off modes of operation of the aircraft can be near vertical in a manner similar to that of a helicopter.

Another object of the present invention is to provide an improved two dimensional vectoring nozzle arrangement wherein a two dimensional exhaust nozzle includes an expandable plug with a pair of parallel side walls and an expandable plug located therein having a first pair of upstream panels traversing the width of the nozzle between the parallel flat side walls thereof and a second pair of downstream panels also traversing the width of the nozzle between the flat side walls thereof and wherein the first and second pairs of panels are pivotally connected by a pivot pin at the trailing edge and leading edge portions thereof, respectively, in the nozzle throat region and wherein means are provided to expand the pivoted point between the pairs of panels to vary the flow area at the throat region of the nozzle and to completely close the throat region to flow therethrough during a vertical take off mode while concurrently controlling a trap door to divert all of the nozzle flow blocked by the expanded plug in a direction generally perpendicular to the flow path through the nozzle upstream of the expanded plug so as to produce a resultant vertical thrust vector on the nozzle assembly wherein take off of an aircraft with the nozzle can be near vertical in a manner similar to that of a helicopter.

Still another object of the present invention is to provide an improved two dimensional vectoring nozzle for use in a vertical take off aircraft having an expandable plug with a plurality of pairs of upstream and downstream panels coupled together by a mechanism to change the flow area through the nozzle throat from a full horizontal thrust flow to a full blockage position and wherein further means are associated with the expandable panels to produce a vertical thrust vector on an aircraft including the nozzle when the expandable plug is in a full throat blockage position so as to divert the exhaust flow from the nozzle upstream of the blocking plug for flow through a nozzle outlet to produce the vertical thrust component on the aircraft to produce take offs that are near vertical similar to that of a helicopter or for nozzle thrust reversal.

Further objects and advantages of the present invention will be apparent from the following description, reference being had to the accompanying drawings wherein a preferred embodiment of the present invention is clearly shown.

FIGS. 1 and 1a are diagrammatic views of an aircraft including the improved two dimensional nozzle and expandable plug of the present invention;

FIG. 2 is a side elevational view of the present invention, partially broken away and partially in section;

Figure 3:
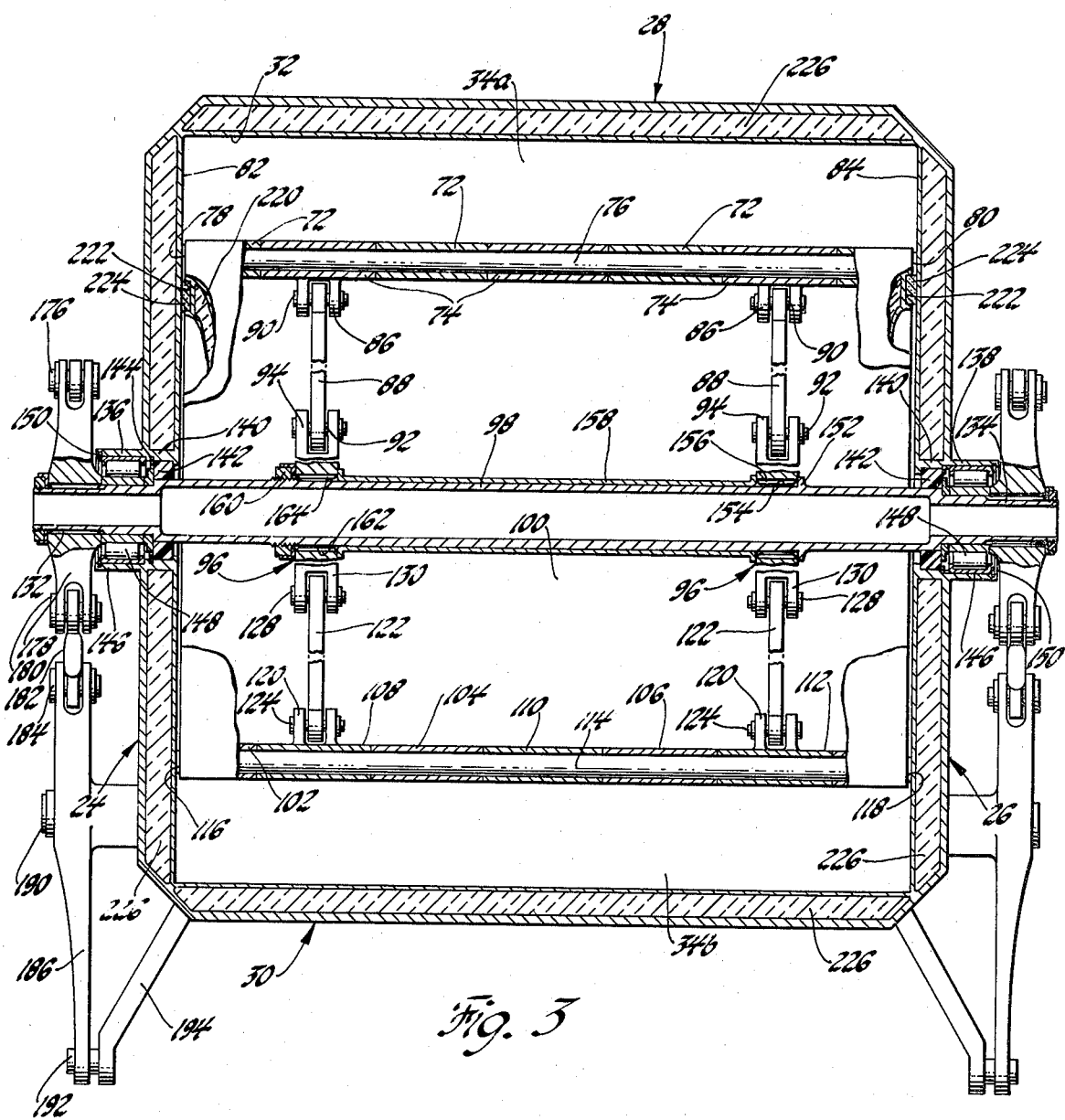
FIG. 3 is an enlarged fragmentary vertical sectional view taken along the line 3—3 of FIG. 2 looking in the direction of the arrow.
Figure 4:
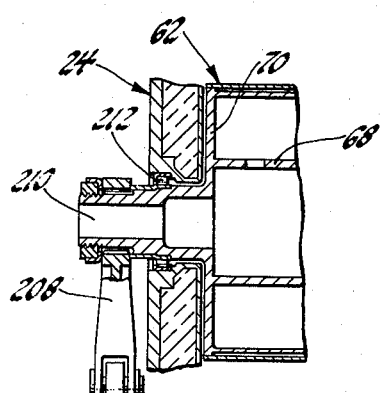
FIG. 4 is an enlarged fragmentary vertical sectional view taken along the line 4—4 of FIG. 2 looking in the direction of the arrows.

FIG. 1 illustrates a jet aircraft 10 including a nozzle assembly 12 constructed in accordance with the present invention and further including a horizontal thrust jet stream 14 therefrom and a vertical thrust component 16 therefrom that, selectively, are produced when an internally located expandable plug assembly 18 is moved between opened and closed positions within the nozzle assembly to cause flow either through the nozzle exit 20 or a downwardly facing exhaust port 22.

The nozzle assembly 12 more particularly is a two dimensional nozzle including an ovate inlet 25 defining a transition to a pair of parallel side walls 24, 26 joined at opposite ends thereof, respectively, to a top wall 28 and a bottom wall 30 of the nozzle 12 in parallel relationship with one another as best shown in FIG. 3. An underbody fuselage installation is illustrated wherein the walls 24 through 30 define a generally rectangularly configured gas flow passage 32 on the underside of the jet aircraft 10. Other installations of the rectangular gas flow path walls can be readily obtained by fitting them into an afterbody of an aircraft and in fuselage installations such as an armpit under the wing.

In the illustrated arrangement the location of the nozzle assembly 12 at the under-the-wing location is suitable for applying a thrust vector during a vertical take off mode of operation of the aircraft 10 so that the take off will be near vertical in a manner similar to a helicopter.

More particularly, the expandable plug assembly 18 is located within the nozzle gas flow path 32 to change the area of the flow path 32 at a throat region 34 of the nozzle 12 as best illustrated in FIG. 2. The expandable plug assembly 18 is configured so that it will change the flow area of nozzle throat region 34 from a maximum open position all the way to a full blockage position. By virtue of this capability, operation of the aircraft from a non-augmented engine cycle to an augmented engine cycle wherein afterburners are operated in conjunction with a normal jet engine cycle can be obtained merely by increasing the area of nozzle throat region 34 from that defined by a first retracted position of plug assembly 18 as shown in solid lines in FIG. 2 to that defined by a more extended position therefrom intermediate the full line position and a dotted line position shown in FIG. 2. Conversely, if a high temperature non-augmented engine cycle were operative, the nozzle throat area produced by the solid line position of plug assembly 18 shown in FIG. 2 can be used for high temperature operation and the intermediate position discussed above can be used for a lower temperature operation condition. The plug assembly 18 is operated so that the area ratio of flow through the throat region 34 to the flow area through the nozzle exit 36 decreases as the nozzle throat area decreases from the high temperature position thereof to the lower temperature operation thereof. This produces an optimization of nozzle expansion ratio with respect to nozzle pressure ratio. Accordingly, the arrangement enables the nozzle exit area 36 to be optimized based upon consideration such as the boattail angle, nozzle weight, overall nozzle performance characteristics and the integrated performance of the propulsion aircraft system.

The expandable plug 18 of the present invention includes a pair of upstream flow diverter panels 38, 40 each having a plurality of hinges 42, 44 thereon interleaved and connected by a hinge pin 46 to define an aerodynamically configured upstream end on plug assembly 18 movable between a retracted and a fully expanded position in which the pin 46 is shifted along the longitudinal axis of the gas flow path 32 as is best illustrated in FIG. 2.

Additionally, the plug assembly 12 includes a pair of downstream panels 48, 50 having a length substantially greater than that of the panels 38, 40. Panels 48, 50 are mirror images of one another. The panels 48, 50 are pivoted with respect to a cross-frame element 52 extending across the nozzle exit 36. More particularly, the trailing edge 54 of the panel 48 is pivotally secured to the frame element 52 by means of a pin 56. Similarly, the trailing edge 58 of the panel 50 is pivotally connected by means of a pin 60 to the frame element 52. The cross-frame element 52 further serves as a support for an airfoil configured tail 62 on the plug assembly 12 that includes an upstream surface of convex form at 64 pivotally supported with respect to a socket surface 66 in the cross-frame element 52. The airfoil configured tail 62 has a cross-frame 68 connected between side walls 70 of tail 62. The tail 62 is pivoted to produce a modest thrust vectoring for ground operation and/or in-flight operation. In addition to the pivotal movement of the tail 62 the upstream pair of diverter panels 38, 40 are hinged to the downstream panels 48, 50 at the trailing and leading edges thereof, respectively. More particularly, the panel 38 has a plurality of hinged ends 72 thereon that are interleaved with respect to spaced hinge ends 74 formed across the upstream end of the width of the panel 48. The hinged ends 72, 74 are joined together by a hinge pin 76. Panels 38, 40 have opposite sides 78, 80 thereon located in close juxtaposed relationship with the inner surfaces 82, 84 of the side walls 24, 26, respectively, as best shown in FIG. 3 to define a side sealed variable flow area 34a at throat 34. A clevis 86 is formed on each side of the upstream end of the panel 48. Each clevis 86 is connected to a link 88 by pivot pin 90. The opposite end of each link 88 is connected by a pivot pin 92 to a bifurcated end 94 of a crank lever 96 on a cross-shaft 98 located within a mechanism chamber 100 formed between the upstream diverter panels 38, 40 and the downstream panels 48, 50. Likewise, the downstream end of the diverter panel 40 includes a plurality of hinged ends 102, 104, 106 interleaved with hinged ends 108, 110, 112 on the upstream edge of the panel 50. A hinge pin 114 is directed through the hinged ends of panels 48, 50. Each panel 40, 50 includes opposite sides 116, 118 thereon located in closed juxtaposed relationship with the inner surfaces 82, 84. The panels 40, 50 thus side seal a second part 34b of the flow path through throat region 34.

A clevis 120 is formed on hinged ends 108, 112 at opposite sides of panel 50. Each clevis 120 is connected to the end of an upwardly directed link 122 by a pivot pin 124. The opposite end 126 of each of the links 122 is connected by a pivot pin 128 to an opposite bifurcated end 130 of each of the levers 96.

Mechanism cross-shaft 98 has opposite ends 132, 134 extending through tubular outboard extensions 136, 138 on the side walls 24, 26 respectively. Each of the tubular extensions 136, 138 includes an inboard segment 140 that supportingly receives an annular seal 142 held in place by a shoulder thereon and a snap ring 144. An outboard segment 146 on each of the tubular extensions 136, 138 supportingly receives a roller bearing assembly 148 held in place by an outboard snap ring 150. The shaft 98 is thereby supported for rotation with respect to fixed side walls 24, 26.

The shaft 98 includes a shoulder 152 inboard of the end 134 thereof and externally splined surface 154 adjacent thereto which is connected to internal splines 156 on one of the crank levers 96. An elongated tubular spacer 158 telescoped on shaft 98 engages the inboard face of the crank lever 96 to maintain splines 154, 156 joined to fixedly secure the aforesaid lever 96 to the shaft 98. The opposite end of the tubular spacer 158 is in contact with the inboard face of the other crank lever 96 which has its outboard face engaged by a lock nut 160 threadably received on the shaft 98 outboard of an externally splined segment 162 on the shaft which is interlocked with an internally splined surface 164 on the crank lever 96 for locking it in place on the shaft 98. Accordingly, the crank levers 96 rotate with the shaft 98 to produce retraction of the upstream pair of diverter panels 38, 40 and concurrent retraction of the downstream diverter panels 48, 50 to the solid line position as shown in FIG. 2. The solid line position represents a horizontal thrust position wherein the exhaust stream 14 is directed rearwardly from the nozzle assembly 12. Counterclockwise rotation of the cross shaft 98, as viewed in FIG. 2, forces the links 88 and 122 outwardly toward the top and bottom walls 28, 30 of the nozzle assembly 12 to cause the pairs of panels 38, 40 and 48, 50 to assume the dotted line position in FIG. 2 which represents a full blockage position within the throat region of the nozzle assembly 12 to prevent flow through nozzle exit 36 and to divert flow through exhaust port 20 to effect vertical thrust.

In accordance with the present invention, movement between the horizontal and vertical thrust positions of expandable plug assembly 18 is produced by an integrated actuator mechanism 165 that coacts with a movable trap door 166 on the bottom wall 30 of the nozzle assembly 12 to control flow from the gas flow path when the expandable plug assembly 18 is in its full blockage position as shown in dotted lines in FIG. 2.

More particularly, integrated actuator mechanism 165 includes a hydraulic power cylinder 168 with one end secured to a frame member 170 by means of a pivoted connection 172. The reciprocating shaft from the cylinder 168 is connected by a pivot pin 176 to a drive lever 178. The driver lever 178 has an opposite end thereof connected by a pivot pin 180 to a link 182 secured by a pivot pin 184 to a trap door lever 186 having a lost motion slot 188 in the opposite end thereof. Its center pivot 190 is proportioned to produce a first arcuate movement wherein the lost motion slot 188 moves downwardly with respect to a follower pin 192 on a dependent flange 194 on the trap door 166 and thereafter further movement of the mechanism 100, which produces full blockage of the rearward flow of gas in flow path 32 by the expandable plug assembly 18, will cause the trap door 166 to move in an upstream direction with respect to the bottom wall 30 to open the exhaust port 22 formed therein and thereby to direct all flow of exhaust from the passage 32 upstream of the expandable plug assembly 18 when in its full blockage position and divert it downwardly through the exhaust port 22 thereby to produce the vertically directed exhaust stream 16 suitable for producing a thrust action on the jet aircraft 10 so that its take off can be vertical, similar to that of a helicopter.

The hydraulic power cylinder 168 can be of the type wherein hydraulic pressure is applied to the cylinder to produce extension of the plug assembly 18 into the full blockage, dotted line position. In such cases, when oil pressure is removed from the chamber, the exhaust nozzle pressure on the expanded surface area of the diverter panels 38, 40, looking in an upstream direction in the gas flow path 32, will produce a resultant force that will contract the plug assembly 18 to its illustrated solid line position (FIG. 2). If the pressure in flow path 32 around the plug assembly is less than that of the internal pressure within the mechanism chamber 100 an alternative hydraulic operator can be utilized wherein oil pressure is used to both expand or contract the linkage.

In the illustrated arrangement, the tail 62 is operated by a hydraulic power cylinder 198 having one end thereof secured to a frame member 200 by a pivotal connection 202. A reciprocating shaft 204 from the cylinder 198 is pivotally connected by a pin 206 to one end of an operating lever 208 that is connected to an outboard extension 210 formed on each side of the tail 62 and supported for rotation on walls 24, 26 by a bearing 212 therein. Pressurization of the hydraulic operator 198 is controlled to produce either a downwardly biased position on the tail as shown at 62a in FIG. 2 or an upwardly biased positioning thereof as shown at 62b in FIG. 2. By virtue of the aforesaid arrangement, multiple modes of thrust vectoring are obtained by varying the flow area through the throat region 34 of the nozzle assembly 12 including modulation of flow therethrough during initial stroke extension of hydraulic power cylinder 168 which produces a slight expansion of the expandable plug assembly 18 without movement of door 166. Slight movement of the lost motion slot 188 decouples lever 186 from follower pin 192 thereby to maintain the trap door 166 closed.

Movement beyond the modulation range to the full blockage position as shown in dotted line in FIG. 2 causes the expandable plug assembly 18 to have its flow diverter panels extended completely across the full height of the gas flow path 32 at the throat region 34 will cause the trap door lever to move the trap door 166 into a full open position for the vertical take-off mode of operation. Additionally, during the horizontal thrust modes, the tail 62 can be adjustably configured to produce further thrust control.

The multiple modes of operation are accomplished by a design that is completely inboard of a two dimensional vectoring nozzle gas flow passageway and is effective to produce control of the area ratio of the nozzle throat area to the nozzle exit area to affect desired results in augmented engine cycles of operation wherein both high and low temperature operations can be accomodated. Furthermore, the arrangement enables the nozzle expansion ratio to be optimized with respect to the nozzle pressure ratio because of the control of gas flow through the throat region 34 of the nozzle assembly 12 upstream of the nozzle exit throat area. The arrangement enables the component parts of the expandable plug to be mirror images of one another. Furthermore, they can be two wall panels having a layer 220 of thermal insulating material therein. In the illustrated arrangement, each of the panels 38, 48; 40, 50 includes a channel 222 on its sides having a seal 224 therein to prevent exhaust gas from flowing into the mechanism chamber 100 internally of the plug assembly 18. The layer of insulation 220 will further thereby maintain the mechanism components at a reduced temperature for prolonged life. Likewise, each of the side walls 24, 26 and the top wall and bottom walls 28, 30 are two-walled structures having a layer of thermal insulating material 226 therein.

A second embodiment of the invention is shown in FIG. 1a wherein a second trap door 230 is included in top wall 232 of a nozzle assembly 234, otherwise identical to nozzle assembly 12. The trap door 230 is connected by linkage 236 which corresponds to that which couples door 166 to power cylinder 168. The door 230 covers an upwardly facing exhaust port 238 in wall 232. In this embodiment, when the nozzle plug is in its block position, both doors 230 and 166 open and split blocked gas exhaust streams shown at 16 and 240 in FIG. 1a occur to produce nozzle thrust reversal as compared to nozzle thrust during normal reversal as compared to nozzle thrust during normal axial exhaust as shown at 14 in FIG. 1.

While the embodiments of the present invention as herein disclosed constitute a preferred form, it is to be understood that other forms might be adopted.

The embodiments of the invention in which an exclusive property or privilege is claimed are defined as follows:

1. A two dimensional gas turbine engine nozzle assembly comprising an ovate inlet and a rectangular exhaust outlet, spaced parallel side walls, an upper wall portion and a lower wall portion defining a minimum height throat region between said inlet and outlet, an expandable plug assembly located within said throat region including flow control means for varying the area of exhaust flow through the throat region for optimizing modulation of axial nozzle thrust produced by flow from said outlet, a vertical thrust door means located on one of said upper or lower walls of said exhaust nozzle upstream of said expandable plug assembly and being selectively movable between open and closed positions, actuator means coupled to said flow control means and to said vertical thrust door means to concurrently block flow through said throat region while opening said vertical thrust door means to direct gas blocked by said plug assembly from a point upstream thereof through said vertical thrust door means thereby to produce a thrust vector on said nozzle assembly arranged generally perpendicularly to its longitudinal axis during periods where flow is blocked therethrough.

2. A two dimensional gas turbine engine nozzle assembly comprising an ovate inlet opening and a rectangular outlet, spaced parallel side walls, an upper wall portion and a lower wall portion defining a gas flow path including a throat region therein, an expandable plug assembly located within said throat region including an upstream pair of flow diverter panels and a downstream pair of flow diverter panels, hinge means joining said panels to produce a pair of expandable apexes thereon for varying the area of exhaust flow through the throat region for optimizing modulation of axial nozzle thrust produced by flow from said outlet, vertical thrust trap door located on said lower wall of said nozzle assembly upstream of said expandable plug assembly and being selectively movable between open and closed positions, actuator means coupled to said hinge means and to said vertical thrust trap door to concurrently block flow through said throat region while opening said vertical trap door to direct gas blocked by said plug assembly from a point upstream thereof through said vertical thrust trap door thereby to produce a thrust vector on said nozzle assembly arranged generally perpendicularly to the flow of gas through said outlet when said throat region is opened.

3. A two dimensional gas turbine engine nozzle assembly comprising an ovate inlet opening and a rectangular outlet, spaced parallel side walls, an upper wall portion and a lower wall portion defining a gas flow path including a throat region therein, an expandable plug assembly located within said throat region including an upstream pair of flow diverter panels and a downstream pair of flow diverter panels, hinge means joining said panels to produce a pair of expandable apexes thereon for varying the area of exhaust flow through the throat region for optimizing modulation of axial nozzle thrust produced by normal axial flow from said outlet, a pair of vertical thrust trap doors located on said upper and lower walls of said nozzle assembly, respectively, and upstream of said expandable plug assembly and being selectively movable between open and closed positions, actuator means coupled to said hinge means and to said pair of vertical thrust trap doors to concurrently block flow through said throat region while opening said pair of vertical trap doors to direct gas blocked by said plug assembly from a point upstream thereof through said pair of vertical thrust trap doors thereby to produce thrust vectors on said nozzle assembly arranged generally perpendicularly to normal axial flow of gas through said outlet when said throat region is opened to produce a nozzle thrust reversal.

* * * * *